3,247,233
ORGANO VANADIUM TETRACARBONYL COMPOUNDS
Robert P. M. Werner, Binningen, Basel-Land, Switzerland, assignor to Ethyl Corporation, New York, N.Y., a corporation of Virginia
No Drawing. Filed Apr. 23, 1962, Ser. No. 190,198
11 Claims. (Cl. 260—429)

This application is a continuation-in-part of application Serial No. 101,652, filed April 10, 1961, and now abandoned.

This invention relates to novel paramagnetic organometallic compounds and to a process for their formation. More specifically, this invention relates to organometallic compounds of vanadium. Furthermore, this invention relates to new tetracarbonyl compounds of vanadium having two V–M bonds, wherein M is a group VA element of atomic number at least 15.

An object of this invention is to provide paramagnetic organometallic compounds of vanadium. Another object of this invention is to provide tetracarbonyl compounds of vanadium which contain two phosphine, arsine, stibine or bismuthine radicals in which the phosphorus, arsenic, bismuth or antimony atoms are bonded to vanadium. Still another object of this invention is to provide a process for the formation of these organometallic compounds. Another object is to provide a process for depositing a vanadium-containing deposit on a variety of substrates.

The objects of this invention are accomplished by providing new vanadium compounds having the formula:

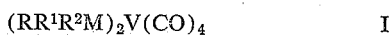

wherein R, R$^1$ and R$^2$ are aromatic benzenoid hydrocarbon radicals having six to about 13 carbon atoms, and M is selected from the class consisting of phosphorus, arsenic, antimony or bismuth.

These compounds are preferred. However compounds having the formulae:

wherein R, R$^1$ and M have the same significance as above are also part of this invention.

The novel compounds of this invention are prepared by a process comprising the reaction of a phosphine, arsine, stibine or bismuthine reactant containing at least one organic radical with vanadium hexacarbonyl. Two molar equivalents of reactant displace two molar equivalents of carbon monoxide in the vanadium hexacarbonyl starting material.

The phosphine, arsine, stibine or bismuthine reactants donate the radicals R, R$^1$ and R$^2$ and the Group VA element M in the above formula. Hence, the molecular configuration of a product of this invention is determined by the nature of the phosphine, arsine, stibine or bismuthine reactants employed.

Phosphines, arsines, stibines and bismuthines reactants having aromatic radicals are preferred since these compounds are more stable than the analogous aliphatic derivatives. The multisubstitute aromatic derivatives, namely, the secondary and tertiary phosphines, arsines, stibines and bismuthines, are more stable than the primary compounds. The most stable reactants are the triaryl phosphines, arsines, stibines, and bismuthines. These compounds yield the most stable compounds of this invention. Therefore, the triaryl derivatives are the most preferred reactants.

The aryl radicals in the phosphine, arsine, stibine and bismuthine reactants contain the phenyl radical or a substituted derivative thereof. Examples include the primary, secondary, and tertiary phosphines, phenyl phosphine $C_6H_5PH_2$, diphenylphosphine $(C_6H_5)_2PH$, and triphenylphosphine $(C_6H_5)_3P$.

The phenyl radical may be substituted by one or more monovalent hydrocarbon radicals. For example, phosphines, arsines, stibines and bismuthines, containing the tolyl, 2,3-xylyl, mesityl, durenyl and pentamethylphenyl radicals are applicable. Examples are tri(2,3-xylyl)phosphine, trimesitylbismuthine and tridurenylstibine. Reaction of these compounds with vanadium hexacarbonyl produces bis[tri(2,3-xylyl) phosphine]vanadium tetracarbonyl bis(trimesitylbismuthine)vanadium tetracarbonyl and bis(tridurenylstibine)vanadium tetracarbonyl, respectively. Similarly, aryl phosphines, arsines, stibines and bismuthines having higher aliphatic radicals substituted on the phenyl ring are applicable in this process. Examples of this type of reaction are tri(ethylphenyl)phosphine, di(butylphenyl)arsine, tri(1,3,5-triethylphenyl)stibine, tri(4-heptylphenyl)phosphine and the like.

The aromatic radicals may also be substituted by radicals such as the benzyl and cyclohexylethyl radicals.

The phenyl ring may also be substituted by one or more divalent radicals. Hence, phosphines, arsines, stibines and bismuthines containing aryl radicals derived from naphthalene, tetralin, phenanthrene and the like are applicable. The trinaphthylphosphine compound depicted below illustrates this type of reactant.

The rings in such compounds may be substituted with various monovalent organic radicals similar to those described above.

It has been found that the essential characteristic of the phosphine, arsine, stibine and bismuthine reactants is the unshared electron pair of the trivalent phosphorus, arsenic, antimony or bismuth atom. There is no exact limitation on the size or complexity of the hydrocarbon constituent bonded to the Group VA element within the phosphines, arsines, stibines and bismuthines. However, reactants having lower aryl radicals of 6 to about 13 carbon atoms are preferred since the phosphine, arsine, stibine and bismuthine reactants containing these types of radicals are generally cheaper and more readily available.

When two or three aryl radicals are bonded to the phosphorus, arsenic, antimony or bismuth atom in the compounds of this invention, the radicals may be alike or different. Hence, such compounds as bis[di(2-methylphenyl)phosphine]vanadium tetracarbonyl and bis[tri(2-methylphenyl)phosphine]vanadium tetracarbonyl are examples of compounds of this invention derived from reactants having identical radicals attached to the Group VA atom. The compounds $$Bis[(C_6H_5)_2(4-CH_3C_6H_4)P]V(CO)_4$$

and

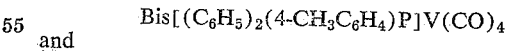

are examples of compounds of this invention derived from phosphines, arsines, stibines and bismuthines having dissimilar aryl radicals bonded to the Group VA element. Because phosphines, arsines, stibines, and bismuthines containing two or three identical radicals are more readily available, the compounds of this invention derived from them are preferred.

Generally, it is preferred that vanadium hexacarbonyl be reacted with only one phosphine, arsine, stibine or bismuthine reactant. However, a variety of compounds can be prepared when two or more reactants are simultaneously employed in the process of this invention. In this case a number of different products are obtained. If desired, the various products can be separated by procedures as fractional crystallization, chromatography and the like. Other separation techniques are known to those skilled in the art.

By using two or more reactants in the process of this invention, compounds designated as

can be prepared. The various radicals have the same significance as those in the formula on column 1, line 33, $x$ and $y$=zero or one and $z=2-(x+y)$. $M_1$ and $M_2$ are either alike or different and are selected from the class consisting of phosphorus, arsenic, antimony and bismuth.

Compounds having up to two Group VA elements and up to six aromatic radicals can be prepared. With this number of combinations it is possible to prepare compounds having characteristics "tailor made" in any property desired.

For example, compounds containing bismuth and antimony such as the compound

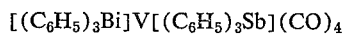

can be thermally decomposed to plate a substrate with an alloy of three metals, vanadium, bismuth and antimony Similarly, the solubility characteristics of the compounds can be altered by varying the number and type of the organic radicals contained within the molecule.

In many instances the compounds of this invention having a symmetrical configuration (within the generic Formula I in column 1, line 33 have utility. Because these compounds are prepared more readily in high yield, they are preferred.

In summary, the essential feature of the ligand bonded to the vanadium atom in the compounds of this invention is the unshared electron pair of the Group VA element. The exact nature of the radicals satisfying the three valences of these atoms is not critical. However, because of the ease of preparation, stability, and the commercial availability of the starting materials necessary for their formation, the preferred phosphine, arsine, stibine and bismuthine vanadium tetracarbonyl compounds of this invention have the following characteristics.

(1) Both of the Group VA elements are identical.
(2) The compounds are symmetrical.
(3) The Group VA elements are contained in tert-phosphine, arsine, stibine and bismuth radicals.
(4) The organic radicals bonded to the Group VA element are aryl radicals.
(5) The aryl radicals contain 6 to about 13 carbon atoms.
(6) The aryl radicals contain an isolated phenyl radical, that is the substituents on the phenyl radical are monovalent.

The preferred compounds of this invention have the generic formula:

$$(RR^1R^2M)_2V(CO)_4$$

wherein R, $R^1$ and $R^2$ are aromatic benzenoid hydrocarbon radicals having 6 to about 13 carbon atoms. The most preferred compounds are those that wherein R, $R^1$ and $R^2$ are identical and contain an isolated benzene nucleus.

The preferred type of aryl radical bonded to the phosphorus, arsenic, antimony or bismuth atoms are hydrocarbon radicals; that is, they are completely composed of carbon and hydrogen. However, the organic radical bonded to the Group VA elements may also contain other groups such as amino, secondary amino, tert-amino, nitro, hydroxy, alkoxy, carboxy, keto, sulfonyl, and the like.

The novel compounds of this invention can also be considered as derivatives of Group VA elements other than nitrogen. There is a decided shift in metallic characteristics in the applicable Group VA elements. Phosphorus is almost a true non-metal and bismuth is almost a true metal. Thus, as the series bis(triaryl phosphine) vanadium tetracarbonyls, bis(triaryl arsine)vanadium tetracarbonyls, bis(triaryl stibine)vanadium tetracarbonyls and bis(triaryl bismuthine)vanadium tetracarbonyl is descended, there is a marked transformation from compounds containing vanadium bonded to only non-metallic elements to a bimetallic compound wherein the atoms are bonded through a semi-polar double bond.

The preferability of the Group VA elements within the compounds of this invention is dependent upon whether compounds containing only one metal or two or three metals are desired. Thus, the bismuthine vanadium compounds of this invention are of special interest since their decomposition can afford a method of plating an alloy of bismuth and vanadium. The phosphine, arsine and stibine derivatives are preferred because of the availability of the starting materials. Phosphine derivatives being the most readily available, the compounds of this invention containing two phosphine radicals are the most preferred compounds.

The novel compounds of this invention are prepared by reacting vanadium hexacarbonyl with the phosphines, arsines, stibines or bismuthines described above. Generally, a solvent is preferred in this reaction. Many of the products of this invention are unstable in most solvents, consequently, a solvent in which the products and reactants are stable, such as a hydrocarbon, is preferred. Applicable hydrocarbon solvents are n-hexane, n-heptane, 2,2,4-dimethylpentane, light petroleum ether, ligroin, and the like. However, any type of inert solvent having the desired characteristics can be employed.

Chlorinated solvents such as dichloromethane, chloroform, carbon tetrachloride, dichlorethylene and the like can also be employed in many instances.

The reaction proceeds well under atmospheric pressure. However, higher and lower pressures can be employed if desired. Mild temperatures in the range of $-10°$ to about $50°$ C. are the temperatures of choice. The preferred temperature range is 15 to 35° C. Usually, the reaction is completed within 36 hours. However, the time is not a true independent variable and is dependent upon the other reaction conditions employed. Higher temperatures usually decrease the reaction time.

The preferred conditions of time, temperature, pressure and solvent are those conditions which are compatible with the reactants and with the products.

The use of a protective atmosphere is preferred. Various inert gases such as nitrogen, helium, argon, neon and the like can be employed. Nitrogen is the preferred gas, since it is inexpensive.

Generally, the new compounds of this invention are solids. They can be separated from the reaction mixture and subsequently purified by methods apparent to those skilled in the art. Separation and purification procedures such as evaporation of the solvent or filtration followed by recrystallization, sublimation or chromatography and the like are examples of suitable techniques.

The following examples are presented to further illustrate the novel compounds of this invention and the process for their formation. All parts are parts by weight unless otherwise noted.

EXAMPLE I

A mixture comprising 3 parts of vanadium hexacarbonyl, 11 parts of triphenylphosphine and 32 parts of n-hexane was stirred at room temperature for five hours. Stirring was continued overnight. The yellow-orange precipitate, which had formed during the reaction, was filtered, washed with n-hexane and dried in vacuum. The yield of crude product was 11.1 parts.

Since the product was unstable in most solvents, it was recrystallized by dissolving small quantities of it in dichlormethane and quickly filtering the solution into a container submerged in a Dry Ice-acetone bath and then adding cold methanol. The total yield of product obtained in this manner was 5.9 parts. It melted at 142° C. with decomposition, was air sensitive, and was paramagnetic. The compound was insoluble in n-hexane, petroleum ether, water, methanol, and ethanol and slightly soluble in ether. It dissolved in benzene and diethyleneglycol dimethylether without any immediate apparent decomposition. In dichloromethane, tetrahydrofuran, acetone and chloroform, it dissolved with slow decomposition giving a dark precipitate. In carbon tetrachloride, it decomposed instantaneously. The compound was analyzed and identified as bis(triphenylphosphine)vanadium tetracarbonyl. Calculated for $C_{40}H_{30}P_2O_4V$: C, 69.87; H, 4.40; P, 9.01; V, 7.41. Found: C, 69.1; H, 4.68; P, 8.9; V, 8.0.

EXAMPLE II

A mixture comprising one part of vanadium hexacarbonyl, 4.8 parts of triphenylstibine, and 20 parts of n-hexane was stirred at room temperature for 3 hours. After continued stirring overnight, a fine, yellow-green precipitate had formed. The reaction mixture was then filtered under nitrogen to remove the precipitate and the precipitate was washed with n-hexane and dried in vacuum. The crude product was dissolved in ice-cold dichloromethane and filtered under nitrogen (using filter aid) directly into stirred, cold methanol which was cooled with Dry Ice. The yellow-green precipitate which was produced was quickly filtered while cold, under nitrogen, washed with cold methanol and dried in vacuum. The product was pyrophoric and showed a strong band at 5.39 microns with shoulders at 5.2 and 5.55 microns. The compound was found to be bis(triphenyl-stibine) vanadium tetracarbonyl by elemental analysis.

Using a similar procedure to that employed in Examples I and II, bis(triphenylarsine)vanadium tetracarbonyl was formed.

EXAMPLE III

Using a procedure similar to Examples I and II, the compound bis(naphthyl phosphine)vanadium tetracarbonyl is prepared. The analogous arsine, stibine and bismuthine derivatives are prepared by a similar proceduce.

EXAMPLE IV

Using a procedure similar to Examples I and II, the compound bis[di(biphenyl)phosphine]vanadium tetracarbonyl is prepared. The analogous arsine, stibine and bismuthine derivatives are prepared by a similar procedure.

EXAMPLE V

Using a procedure similar to Examples I and II, the compound bis[tri(2,4-dipropyl)phenylphosphine]vanadium tetracarbonyl is prepared. The analogous arsine, stibine and bismuthine derivatives are prepared by a similar procedure.

EXAMPLE VI

Using a procedure similar to Examples I and II, the compound bis[tri(3-heptylphenyl) phosphine]vanadium tetracarbonyl is prepared. The analogous arsine, stibine and bismuthine derivatives are prepared by a similar procedure.

EXAMPLE VII

Using a procedure similar to Examples I and II, the compound bis[(phenyl)(tolyl) phosphine]vanadium tetracarbonyl is prepared. The analogous arsine, stibine and bismuthine derivatives are prepared by a similar procedure.

EXAMPLE VIII

Using a procedure similar to Examples I and II, the compound bis[(phenyl)(2-tolyl)(2,3-xylyl) phosphine] vanadium tetracarbonyl is prepared. The analogous arsine, stibine and bismuthine derivatives are prepared by a similar procedure.

EXAMPLE IX

*Vapor phase plating of a steel with bis(triphenylphosphine)vanadium tetracarbonyl*

A suitable quantity of bis(triphenylphosphine)vanadium tetracarbonyl is placed into a reservoir equipped with heating means. The reservoir is connected through a valve to a plating chamber wherein the object to be plated, a steel plate, is supported. The steel plate is connected to a temperature measuring device. The plating chamber is equipped with an induction coil which surrounds the metal object to be plated. The plating chamber is connected to a cold trap downstream from the reservoir and the cold trap is connected to a vacuum pump. The system is evacuated to a pressure less than 0.2 mm. of mercury. The reservoir is sufficiently heated to volatilize the bis(triphenylphosphine) vanadium tetracarbonyl and to provide a steady continuous evolution of that compound. The temperature of the steel plate is raised to 400–550° C.

Upon contact of the vapor with the hot steel plate, a metallic vanadium-containing deposit is deposited on the plate. The organic vapors resulting from the decomposition of the plating compound together with the unused plating compound are collected in the cold trap. The unused material is recovered by suitable extraction and crystallization and used in another run.

Any material which can withstand a temperature of 400° C. can be plated with a vanadium-containing deposit using this technique. Iron, copper, bronze, brass, chromium, and various porcelains and other ceramics can be coated.

An object of this invention is to provide an improved method for plating vanadium on a variety of substrates. A further object is to provide a more efficient and effective method for plating tantalum in an economical manner.

The above and other objects are accomplished by a process for plating vanadium upon a substrate which comprises thermally decomposing a vapor consisting essentially of bis(arylphosphine, arsine, stibine and bismuthine)vanadium tetracarbonyls in contact with said substrate wherein said process is conducted at a temperature of from about 200° C. to about 600° C., and at a pressure of from about 0.01 mm. to about 10 mm. of mercury. The objects set out hereinabove are further accomplished by a process for plating vanadium on a substrate which comprises heating said substrate to a temperature of between about 200° C. to about 500° C. and contacting a vapor consisting essentially of one of the compounds prepared by the process of this invention with said substrate wherein said contacting is carried out at a pressure of between about 0.01 mm. to about 10 mm. of mercury.

The deposition chamber pressure may range from about 0.001 mm. of mercury to about 30 mm. of mercury. The preferred pressure in the deposition chamber is from about 0.01 to about 10 mm. of mercury since better plates are obtained within this pressure range and transportation of the plating vapor is facilitated. The most preferred pressure range is from about 0.01 to about 0.5 mm. of mercury since better results are obtained within this range.

The temperature conditions coupled with pressure in the plating chamber forms the critical feature of the present process. Thus, where the temperature ranges from about 200° C. to about 600° C. preferably 500° C. to 550° C., and the pressure in the chamber ranges from about 0.01 to about 10 mm. of mercury, better plates are obtained having better adherence to the substrate and pinhole free surfaces.

In the process of this invention a carrier gas is not required or desirable. Generally carrier gases tend to react with the vanadium being plated to form carbides, nitrides or other products as the metal is deposited upon the substrate. Furthermore, carrier gases usually contain small amounts of impurities which ultimately effect the plating process. Hence, a carrier gas is not generally used in the process of this invention and is preferably avoided. However, under some circumstances, because of the more improved plates obtained by the unique combination of temperature and pressure conditions of this invention, carrier gases such as hydrogen, carbon dioxide, nitrogen and argon may be tolerated and used to facilitate the flow of the vaporized plating compound.

In initially vaporizing the plating compound prior to its use in the actual plating operation, temperatures from about 100° C. to about 200° C. may be used. It is preferred, however, to vaporize the novel vanadium tetracarbonyl compound at temperatures from about 150° C. to about 200° C. The temperature used depends on the flow rate desired.

The flow rate of the vanadium vapor is dependent to a certain extent upon the amount of pressure in the plating chamber and the temperature to which the compound is subjected. Ordinarily, the flow rates of the plating compound employed vary from about one foot per minute to about 30 feet per second although faster or slower rates can be employed.

The time required to plate vanadium by the process of this invention varies over a wide range, depending on flow rate, desired coating thickness, deposition chamber pressure, temperature of the substrate and the vaporization temperature of the plating compound. However, times from about 15 minutes to about 10 hours are generally acceptable. For economic reasons, it is preferred, however, that the process time range from about 30 minutes to about 3 hours, depending on the desired thickness of the chromium coating.

Adherent vanadium metal coatings can be obtained through depositing its vapor directly upon any substrate which can withstand the plating conditions. Typical examples of substrates that may be plated are nickel, Pyrex glass, beryllium, molybdenum, graphite, ceramics, high temperature resistant plastics and the like. The preferred substrates that can be plated are ferrous metal substrates, aluminum and the like.

In some cases, the substrate to be plated is preferably subjected to initial preparation. This is especially true in the case of metal substrates. In other words, the degree of adherence achieved through the unique vapor plating process of this invention, in some instances where desirable, can be further improved by an appropriate metal surface pre-treatment. The best metal surface preparation is achieved through degreasing with a solvent such as 1,1,2-trichloroethylene or the like followed by light sandblasting. The vapor plated coatings have even better adherence on slightly uneven surfaces, such as created by sandblasting, than on highly polished substrates. Thus, not desiring to be bound by theoretical considerations, it is felt that sandblasting permits a better anchoring effect of the deposited metal which penetrates into the small pits of the surface. On substrates such as graphite and ceramics where the surface is already non-uniform, if desired, degreasing can be performed to assure a clean plating surface. Other substrate pre-treatments known to the art can be employed, if desired, and will now be evident for the above and other substrates.

The types of apparatus which may be used for the plating operation are any of the apparatus described in the prior art, such as set forth by Lander and Germer in "Plating Molybdenum, Tungsten and Chromium by Thermal Deposition of Their Carbonyls," or by Powell, Campbell and Gonser in the book "Vapor Plating," by John Wiley and Sons, New York, 1955, wherein a vacuum chamber is used.

Heating may be achieved by numerous methods. Generally, resistance heating, infrared heating or induction heating are used according to the nature of the substrate and the type of equipment employed since the equipment largely determines the heat requirements. Flat samples such as metal plates can generally be heated by resistance heating apparatus such as a hot plate. For uneven shaped objects, induction heating or infrared heating may be used, depending on the nature of the substrate.

For the plating operation of this invention, the object to be plated is heated to a temperature of 250 to 550° C. preferably 300 to 450° C. in an enclosed chamber. The system is evacuated and the plating agent is heated to an appropriate temperature wherein it possesses vapor pressure of preferably up to about 5 mm. of mercury. In most instances the process is conducted at no lower than 0.01 mm. mercury pressure. The vapors of the plating agent are pulled through the system as the vacuum pump operates, and they impinge on the heated object, decomposing and forming the metallic coating.

In addition to the thermal decomposition techniques discussed hereinabove for decomposing the plating agents of this invention, other methods for decomposition can be employed. Such methods are decomposition of the vanadium compound by ultrasonic frequency or by ultraviolet irradiation. The former process involves essentially the same procedure as employed in Example IX with the exception that an ultrasonic generator is proximately positioned to the plating apparatus. The vanadium compound is then heated to its decomposition threshold and thereafter the ultrasonic generator is utilized to effect final decomposition. Decomposition by ultraviolet irradiation involves essentially the same method as utilized in Example IX with the exception that in place of the resistance furnace there is utilized for heating a battery of ultraviolet and infrared lamps placed circumferentially around the outside of the heating chamber. The substrate to be heated is brought to a temperature just below the decomposition temperature of the vanadium plating agent with the infrared heating and thereafter decomposition is effected with ultraviolet rays.

Although the above techniques generally employ the vanadium plating agent in its vapor phase, other techniques besides vapor phase plating can be employed. For example, the substrate to be plated can be placed in a decomposition chamber and the plating agent packed in contact with the element and thereafter heated to a temperature above the decomposition temperature of the plating agent. The volatile by-products of the decomposition reaction escape leaving an adherent deposit on the substrate.

Deposition of metal on a glass cloth illustrates the latter process. A glass cloth band weighing one gram is dried for one hour in an oven at 150° C. It is then placed in a tube which is devoid of air and there is added to the tube 0.5 gram of bis(triphenylphosphine)vanadium tetracarbonyl. The tube is heated at 400° C. for one hour after which time the tube is cooled and opened. The cloth has a uniform metallic grey appearance and exhibits a gain in weight. The cloth has greatly decreased resistivity. An application of current to the cloth causes an increase in its temperature. Thus, a conducting cloth is prepared. This cloth can be used to reduce static electricity, for decoration, for thermal insulation by reflection, and as a heating element.

The novel compounds of this invention are particularly useful as chemical intermediates, fuel and lubricating oil additives, polymerization catalysts, combustion control additives, fungicides, herbicides, pesticides and bactericides.

Having fully described the novel compounds of this invention, their mode of preparation and their utility, I desire to be limited only within the lawful scope of the appended claims.

I claim:
1. Compounds having the formula

$$(RR^1R^2M)_2V(CO)_4$$

wherein R, $R^1$ and $R^2$ are aromatic benzenoid hydrocarbon radicals having six to about 13 carbon atoms and M is a Group VA element of atomic number at least 15.

2. The compounds of claim 1 wherein R, $R^1$ and $R^2$ are identical.

3. Bis(triphenylphosphine)vanadium tetracarbonyl.

4. Bis(triphenylstibine)vanadium tetracarbonyl.

5. A process for the formation of compounds having the formula $(RR^1R^2M)_2V(CO)_4$, said process comprising reacting a compound having the formula $(RR^1R^2M)$ wherein R, $R^1$ and $R^2$ are aromatic benzenoid hydrocarbon radicals having six to about 13 carbon atoms, and M is a Group VA element of atomic number at least 15, with vanadium hexacarbonyl.

6. Process for the formation of bis(triphenylphosphine)vanadium tetracarbonyl, said process comprising reacting triphenylphosphine with vanadium hexacarbonyl.

7. Process for the formation of bis(triphenylstibine)-vanadium tetracarbonyl, said process comprising reacting triphenylstibine with vanadium hexacarbonyl.

8. Bis(triphenylarsine)vanadium tetracarbonyl.

9. The process of claim 5 being carried out at a temperature within the range of from about −10° to about 50° C.

10. The process of claim 5 being carried out in the presence of an inert organic solvent.

11. Process for the preparation of bis(triphenylarsine)-vanadium tetracarbonyl, said process comprising reacting triphenylarsine with vanadium hexacarbonyl.

References Cited by the Examiner

UNITED STATES PATENTS

| | | | |
|---|---|---|---|
| 2,818,416 | 12/1957 | Brown et al. | 260—429 |
| 2,886,468 | 5/1959 | Hoover et al. | 117—107 |
| 2,898,235 | 8/1959 | Bulloff | 117—107 |
| 2,952,697 | 9/1960 | Gorsich | 260—429 |
| 3,010,978 | 11/1961 | Antonsen | 260—429 |

OTHER REFERENCES

Matthews et al.: J.A.C.S., 81, No. 9, pp. 2373–4, May 5, 1959.

TOBIAS E. LEVOW, *Primary Examiner*.